(12) United States Patent
Foote

(10) Patent No.: US 9,942,459 B2
(45) Date of Patent: Apr. 10, 2018

(54) METHOD AND SYSTEM FOR IMAGE QUALITY LEARNING WITH SOLID STATE IMAGE SENSORS

(75) Inventor: William Foote, Edinburgh (GB)

(73) Assignee: STMICROELECTRONICS (RESEARCH & DEVELOPMENT) LIMITED, Marlow (GB)

( * ) Notice: Subject to any disclaimer, the term of this patent is extended or adjusted under 35 U.S.C. 154(b) by 1365 days.

(21) Appl. No.: 13/543,523

(22) Filed: Jul. 6, 2012

(65) Prior Publication Data

US 2013/0016243 A1      Jan. 17, 2013

(30) Foreign Application Priority Data

Jul. 14, 2011 (GB) .................................. 1112129.0

(51) Int. Cl.
*H04N 5/232* (2006.01)
*H04N 9/73* (2006.01)

(52) U.S. Cl.
CPC ......... *H04N 5/23212* (2013.01); *H04N 9/735* (2013.01)

(58) Field of Classification Search
CPC ........ H04N 9/045; H04N 5/232; H04N 5/772; H04N 5/335; H04N 5/23293
USPC ..................................................... 348/222.1
See application file for complete search history.

(56) References Cited

U.S. PATENT DOCUMENTS

| | | | |
|---|---|---|---|
| 6,627,863 B2 * | 9/2003 | Wasserman ................... 250/205 |
| 8,094,211 B2 * | 1/2012 | Kwon et al. ................ 348/229.1 |
| 8,184,924 B2 * | 5/2012 | Tsuruoka ....................... 382/274 |
| 2003/0146983 A1 * | 8/2003 | Hoshuyama ............... 348/223.1 |
| 2004/0119877 A1 | 6/2004 | Shinozaki |
| 2011/0122277 A1 * | 5/2011 | Eto et al. ................... 348/222.1 |

FOREIGN PATENT DOCUMENTS

| | | |
|---|---|---|
| JP | 6319069 A | 11/1994 |
| JP | 2009216935 A | 9/2009 |

* cited by examiner

*Primary Examiner* — Twyler Haskins
*Assistant Examiner* — Fayez Bhuiyan
(74) *Attorney, Agent, or Firm* — Seed IP Law Group LLP

(57) ABSTRACT

The present disclosure relates to solid state image sensors in digital imaging systems, more particularly to an image quality learning method and system for solid state image sensors. One of the advantages of the method according to an embodiment of the present disclosure is to allow the implementation of a digital machine vision system with a faster convergence of an Image Quality algorithm, which results in a shorter delay for the user. According to an embodiment of the present disclosure, the method is performed as a recursive algorithm which tends to converge to an Image Quality setting satisfying image quality criteria.

28 Claims, 4 Drawing Sheets

METHOD AND SYSTEM FOR IMAGE QUALITY LEARNING WITH SOLID STATE IMAGE SENSORS

BACKGROUND

Technical Field

The present disclosure relates to solid state image sensors in digital imaging systems, more particularly to an image quality learning method and system for solid state image sensors.

Description of the Related Art

Solid state image sensors normally include an array of pixels arranged in rows and columns which form a bi-dimensional image representation. An image is read out, row by row, via an array of Analogue to Digital Converters (ADC). Light is incident on these pixels for a time called integration time and the resulting charge is converted into a voltage before being read out. The readout process includes converting the analogue voltage to a digital value and then processing the collected digital values in order to construct an image.

The digital values in the constructed image will be an imperfect representation of the scene. The Image Quality (IQ) of a constructed image measures the degradation from what is considered by the system as the optimal image. The sensor is designed and set up in such a way that it reduces the various factors of degradation. Such an optimal image is determined within the system by comparison of the selected measured parameters with a determined value or range of values.

Commercially available machine vision systems use an Image Quality mechanism which implements algorithms to automatically determine the optimal setting of image parameters. Each algorithm calculates a set of metrics from the image data to quantify the current performance of the camera system. Examples of IQ metrics include focus, brightness, white balance, etc. These metrics are normally calculated over several frames, so that the algorithm can "search" for the optimal settings for the camera system. While working reasonably well, these algorithms often take several frames to "converge" to the correct settings, because the optimal convergence point cannot be calculated with information from just one frame. Therefore the user might be obliged to wait for some time (e.g., a few seconds) to get the image at a satisfactory quality level. This delay even if limited to a couple of seconds could be annoying and could represent the difference between "capturing the moment" and losing it.

BRIEF SUMMARY

Embodiments of the present disclosure may overcome at least some of the problems associated with the prior art.

According to one embodiment of the present disclosure there is provided a method for determining an optimal setting of a camera, the camera being controlled by a data processing device and including a repository of historic data relating to previously captured digital images, the method including: the data processing device determining at least one starting setting including a value for at least one controllable parameter of a digital image, the at least one controllable parameter including a value indicative of an average of historic data of previously captured digital images; responsive to a user request, the camera receiving a digital image; the data processing device calculating image metrics according to the at least one controllable parameter; the data processing device comparing the value of each at least one controllable parameter with a determined threshold range; the data processing device recursively adjusting the value of the at least one controllable parameter until each value is within the determined threshold range; and the data processing device storing the adjusted value in the repository of historic data and modifying the at least one starting setting accordingly.

Embodiments of the present disclosure may offer a number of benefits. One of the advantages of the method according to an embodiment of the present disclosure is to allow the implementation of a digital machine vision system with a faster convergence of an Image Quality algorithm, which results in a shorter delay for the user. According to an embodiment of the present disclosure, the method is performed as a recursive algorithm which tends to converge to an Image Quality setting satisfying image quality criteria.

In an embodiment, a method comprises: determining, using a data processing device, at least one starting setting of an image sensor, the starting setting including a value for at least one controllable parameter of the image sensor, the at least one controllable parameter including a value indicative of an average of historic data associated with previously captured digital images; receiving, responsive to a user request, a digital image with the image sensor; calculating, using the data processing device, an image metric according to the at least one controllable parameter; comparing, using the data processing device, the calculated image metric with a threshold range; recursively adjusting, using the data processing device, the value of the at least one controllable parameter until the calculated image metric is within the threshold range; storing, using the data processing device, the adjusted value in a repository of historic data; and modifying, using the data processing device, the starting setting based on the adjusted value of the at least one controllable parameter. In an embodiment, the modifying includes determining a new value for a starting setting NLS according to the following formula:

$$NLS=ELS-(ELS-LUS)*WF,$$

where ELS=existing starting settings; LUS=last used settings; and WF=determined weighting factor. In an embodiment, the recursively adjusting includes using an image quality algorithm. In an embodiment, the image quality algorithm includes a hill climb search algorithm. In an embodiment, the at least one controllable parameter comprises a plurality of controllable parameters, a plurality of image metrics associated with respective controllable parameters of the plurality of the controllable parameters are calculated, and each of the plurality of calculated image metrics are compared to a respective threshold range.

In an embodiment, a system comprises: a memory configured to store historical data related to previously captured digital images; and one or more processing devices configured to: retrieve a stored image-sensor control parameter from the memory, the control parameter including a value indicative of an average of historic data associated with previously captured digital images; calculate an image metric of an image received according to the control parameter; compare the calculated image metric with an image-metric threshold range; recursively adjust the value of the control parameter, calculate the image metric and compare the calculated image metric with the image-metric threshold range until the calculated image metric is within the image-metric threshold range; and modify the value indicative of the average of historical data of the stored image-sensor control parameter based on the adjusted value of the control parameter. In an embodiment, the system further comprises a solid state image sensor coupled to the one or more processing devices. In an embodiment, the system further comprises an integrated circuit including at least one of: the one or more processing devices; and the solid state image sensor. In an embodiment, the one or more processing devices is configured to modify the value indicative of the historical data NLS according to:

$$NLS=ELS-(ELS-LUS)*WF,$$

Where ELS=existing starting settings; LUS=last used settings; and WF=determined weighting factor. In an embodiment, the one or more processing devices is configured to employ an image quality algorithm in the recursively adjusting. In an embodiment, the image quality algorithm includes at least one of: a hill climb search algorithm; a full sweep search; and an adaptive step size hill climb algorithm. In an embodiment, the one or more processing devices are configured to: calculate a plurality of image metrics of the received image according to the control parameter; compare the plurality of calculated image metrics with respective threshold ranges; and recursively adjust the value of the control parameter, calculate the plurality of image metrics and compare the calculated image metrics with the respective threshold ranges until the calculated image metrics are within the respective threshold ranges. In an embodiment, the system is configured as a digital image processing device. In an embodiment, the one or more processing devices are configured to implement: a statistics accumulator configured to calculate the image metric; and an exposure controller configured to recursively adjust the value of the control parameter, calculate the image metric and compare the calculated image metric with the threshold range until the calculated image metric is within the threshold range. In an embodiment, the system further comprises a mobile phone transceiver.

In an embodiment, a non-transitory computer-readable medium's contents configure an image sensor controller to perform a method, the method comprising: determining at least one control parameter of the image sensor, the at least one control parameter including a value indicative of an average of historic data of previously captured digital images; calculating a plurality of image metrics of a digital image received according to the at least one control parameter; comparing each of the plurality of image metrics with a respective image-metric threshold range; recursively adjusting the value of the at least one control parameter until each calculated image metric is within the respective image-metric threshold range; and modifying the value indicative of the average of historical data based on the adjusted value of the at least one control parameter. In an embodiment, the modifying includes determining a new value of a starting setting NLS according to the following formula:

$$NLS=ELS-(ELS-LUS)*WF,$$

where, ELS=existing starting settings; LUS=last used settings; and WF=determined weighting factor. In an embodiment, the non-transitory computer-readable medium comprises an imaging software product.

In an embodiment, an electronic device comprises: a statistics accumulator configured to calculate image metrics of received images; and an exposure controller configured to: retrieve a stored image-sensor control parameter including at least one value indicative of an average of historical data of previously captured digital images; recursively, compare one or more calculated image metrics of a received image with one or more corresponding image-metric threshold ranges; and adjust the value of the control parameter until the one or more calculated image metrics are within the one or more corresponding image-metric threshold ranges; and modify the value indicative of the average of historical data of the stored image-sensor control parameter based on the adjusted value of the control parameter. In an embodiment, the exposure controller is devices is configured to modify the value indicative of the historical data NLS according to:

$$NLS=ELS-(ELS-LUS)*WF,$$

where ELS=existing starting settings; LUS=last used settings; and WF=determined weighting factor. In an embodiment, the exposure controller is configured to employ at least one of: a hill climb search algorithm; a full sweep search; and an adaptive step size hill climb algorithm.

In an embodiment, a system comprises: means for calculating image metrics of received digital images; and means for: retrieving a stored image-sensor control parameter including at least one value indicative of an average of historical data of previously captured digital images; recursively, comparing one or more calculated image metrics of a received image with one or more corresponding image-metric threshold ranges; and adjusting the value of the control parameter until the one or more calculated image metrics are within the one or more corresponding image-metric threshold ranges; and modifying the value indicative of the average of historical data of the stored image-sensor control parameter based on the adjusted value of the control parameter. In an embodiment, the system further comprises a memory configured to store the stored image-sensor control parameter. In an embodiment, the system further comprises an image sensor.

BRIEF DESCRIPTION OF THE SEVERAL VIEWS OF THE DRAWINGS

Reference will now be made, by way of example, to the accompanying drawings, in which:

FIG. 3 is a diagram showing the autofocus iterations with a state of the art algorithm, while

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations, such as, for example, pixel arrays, microprocessors, etc., are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
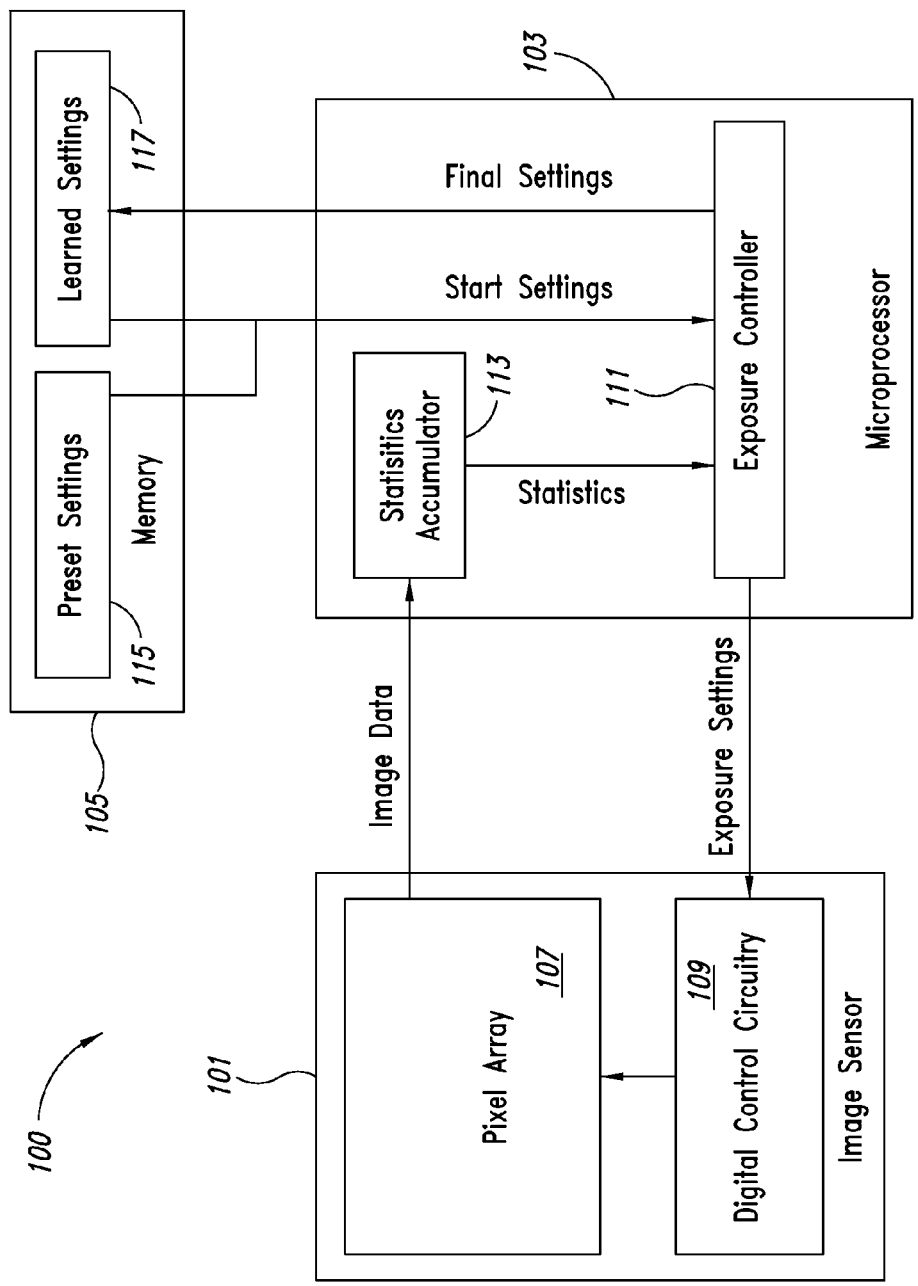
FIG. 1 schematically shows a machine vision system according to an embodiment of the present disclosure.

FIG. 1 shows a simplified block diagram of a machine vision system 100 which could be used to implement an exposure control system using the method of an embodiment of the present disclosure. The diagram shows an embodiment of the present disclosure, including 3 hardware components: an Image Sensor 101 (e.g., a CMOS integrated sensor), a Microprocessor 103 and a Memory Store 105 (including a Preset settings storage area 115 and a Learned settings storage area 117). These HW components could be integrated into 1, 2 or 3 separate components. In an embodiment of the present disclosure, Image Sensor 101 includes a Pixel Array 107 configured to capture one or more digital images and a Digital control circuitry module 109 which controls the operations of the Image Sensor 101. The Microprocessor 103 contains an exposure controller 111 which takes a starting position for exposure from Memory 105 and modifies the operation of the pixel array 107 by sending exposure settings to control circuitry 109 on the Image Sensor 101. The pixel array 107 produces image data, from which a statistics accumulator 113 on the Microprocessor 103 generates statistics. This control loop continues to execute until convergence conditions have been met. The convergence exposure settings deemed acceptable by the exposure controller 111 are stored to Memory 105. It is expected that these learned settings would be used at a later time to choose a better starting position. The machine vision system described in the present disclosure can be implemented in a photo-camera or a video-camera, but also in any apparatus having a built in camera, e.g., a mobile phone or a computer with web cam facilities.

Figure 2:
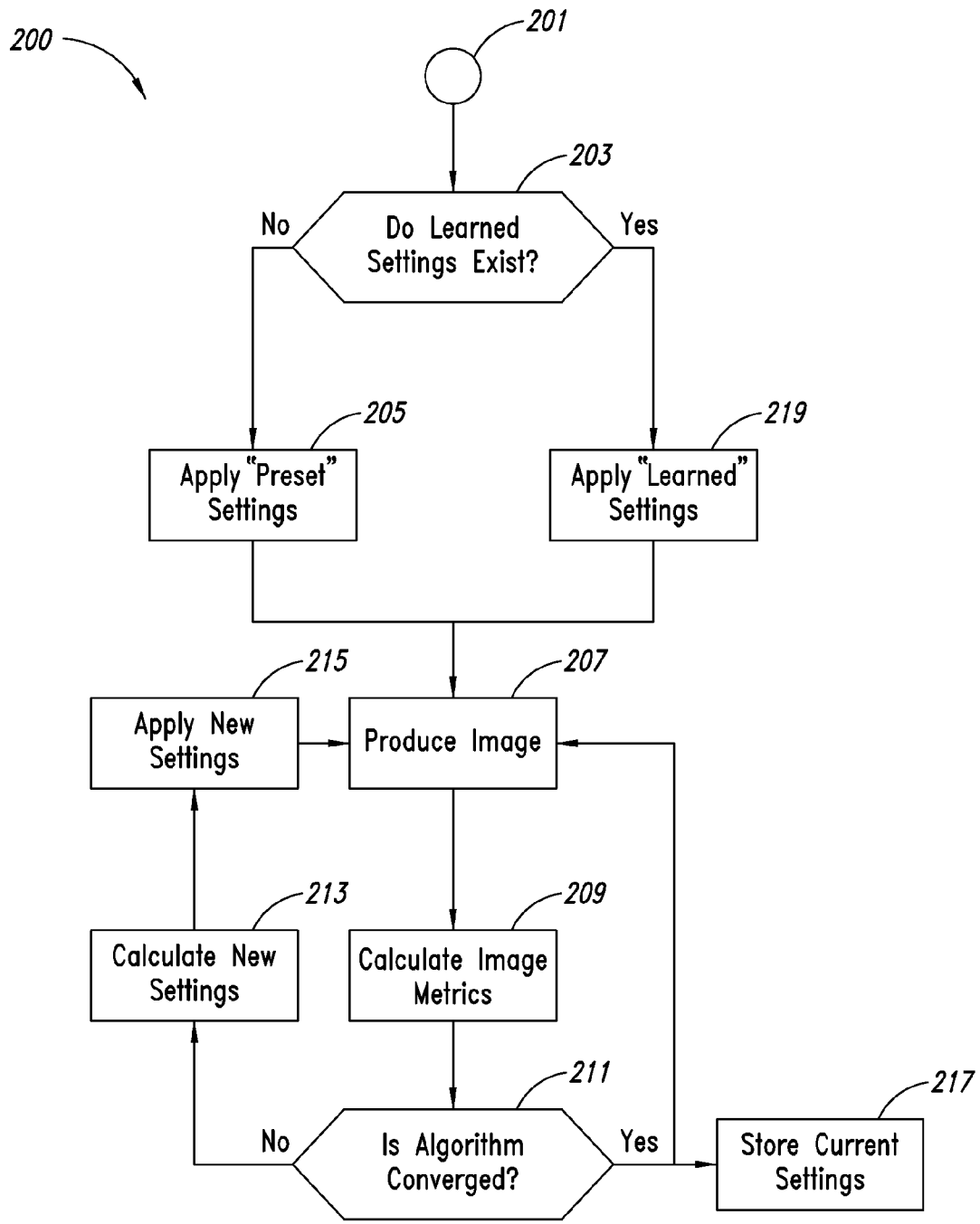
FIG. 2 is a diagram of the method steps of an embodiment of the present disclosure.

FIG. 2 schematically shows a diagram representing a method 200 of an embodiment of the present disclosure. The process starts at circle 201 where the camera function is enabled: this can be done in many different ways according to the structure and the way the camera works, e.g., it can be just the switching on of the camera or the camera function of, e.g., a mobile phone, or maybe the pressing by the user of a button. The control is then transferred to box 203 where the system checks whether previously "learned" settings exists. If they don't, the system starts the optimization process from what is available in the pre-set repository (115). The presetting can be a general one, e.g., having all the parameters set at a middle value which aims at minimizing the average changes; alternatively several pre-settings might be stored, in which case the most suitable among the available pre-set settings is selected and applied to the system (step 205). A default pre-setting may be selected by the design engineer suitable for the most typical user in some embodiments. In at least some embodiments, a user may configure existing pre-set settings and/or add new pre-set settings. At step 207 the image is acquired (produced) according to the selected parameters and according to the scene being selected (e.g., by pointing the camera lens) by the user; the acquired image is normally shown to the user by means of, e.g., a built in LCD display, so that the user can check the progress of the convergence algorithm. Then the system calculates the image metrics (step 209) measuring the value of a number of parameters (e.g., focus, brightness, color balance, etc.): the measured parameters are then compared to determined expected values or ranges of expected values. The system verifies at step 211 whether the algorithm is converged, i.e., if the expected values (or ranges of values) are respected. If not, i.e., the algorithm is not considered to be "converged" (or it does not reach a determined "convergence" threshold), the system calculates (step 213) new settings according to an Image Quality algorithm. This can be done in several ways. According to an embodiment of the present disclosure a Hill Climb Search algorithm is implemented for AutoFocus. However those skilled in the art will appreciate that other convergence algorithms could be used instead, e.g., Full Sweep Search, Adaptive Step Size Hill Climb etc. The new calculated settings are applied (step 215) to the image and the process returns to step 207. If at step 211 the algorithm determines that the measured metrics satisfy the determined requirements to consider the algorithm "converged", then the settings are stored (step 217) in the learned settings repository (117) for future reuse. Another possible trigger for updating the "learned settings" could be the fact that the user captures the image (i.e., it is assumed they are reasonably happy to take the picture). The storing of the optimized settings can be done in several different forms and the use of such stored data can be implemented in a plurality of different ways. For example it is possible to create a single averaged optimized setting which takes into accounts all successive "converged" calculations: in this way each user's preference is stored in the form of an average of all parameters which will be used as a starting point for the next use of the camera; the advantage of the present method is that the starting point will be closer to the expected use made by the same user. In other words, the present method aims at capturing a trend which can be derived, e.g., by historic data of most recent use of the camera. As an example if the user has taken 90 portraits in the last 100 shots it is likely that the next picture will be another portrait and the stored setting will contain this "trend" in the averaged values of all the measured parameters. Using the method according to an embodiment of the present disclosure, a user would not need to know that this process even exists, but will benefit from getting their typically used settings available more quickly. The process can continue going back to step 207 where a new image is produced and the convergence algorithm continues: if the detected image does not change then also the algorithm does not need to make any changes to the settings, otherwise if the image changes new adjustments might be needed. In an embodiment of the present disclosure the method does not stop (unless explicitly instructed by the user) even when the picture is taken, because the camera tries to get ready for the next picture with new optimized parameters. Taking a track and a count of the pictures taken can be useful for the purpose of the method according to an embodiment of the present disclosure, even if the process does not stop, because of statistics. Going back to step 203, if a learned setting does exist, then the process applies the learned setting (step 219) and goes to step 207 as explained above. If the camera is switched off, when the user switches the camera on at a later time, the system may choose a different starting setting to begin convergence from, depending on what historical data is stored on the device's memory.

A solution for speeding up the convergence process is that of storing a number of "preset" starting points carefully selected by the engineering team responsible for the product design. These starting points are chosen to allow fast convergence on virtually any potential scene the machine vision system user could be trying to capture. While improving the speed in difficult conditions, a drawback of this method is that other scenes might take longer than is normally really necessary.

The method of choosing a better starting position, according to an embodiment of the present disclosure, could take many embodiments. A rudimentary algorithm may simply use the last used settings, as stored in Memory 105. A slightly more advanced algorithm could use weighting so that each completed execution of the exposure algorithm only slightly modifies the existing learned settings. For example, ELS=Existing Learned Settings
NLS=New Learned Settings
LUS=Last Used Settings
WF=Weighting Factor $$NLS=ELS-(ELS-LUS)*WF.$$

Figure 3:
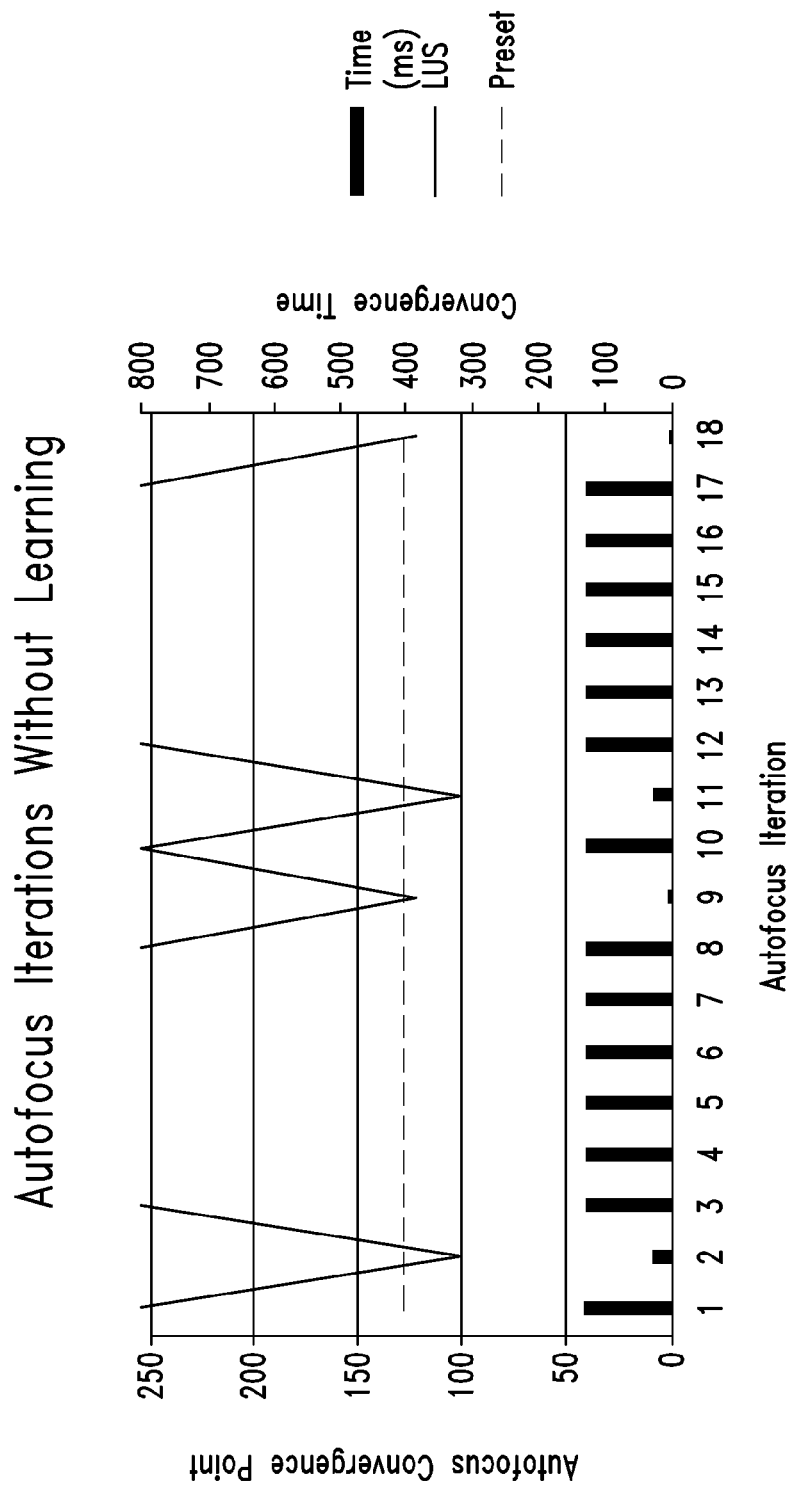

FIG. 3 shows an example of a state of the art Autofocus algorithm executing over several iterations, where the range of convergence points for the actuator is 0 to 255. The system has been designed to have a factory pre-set of position 127, represented by the broken line. The end positions chosen by the Autofocus algorithm are shown by the solid line. The user has mostly taken images at one end of the optical range, position 255. This position 255 could represent either near field (Macro) or far field (Infinity) depending on the design of the camera system. It is expected that the further the actuator starts from its final convergence point, the longer it will take to reach it. A simplification is used to represent the time taken to travel 1 single step as 1 ms. Therefore starting at 127 and finishing at 255 takes 128 ms, and so the worst case time taken to reach the final position is 128 ms. The average time taken over 18 iterations for this example is 103 ms.

Figure 4:
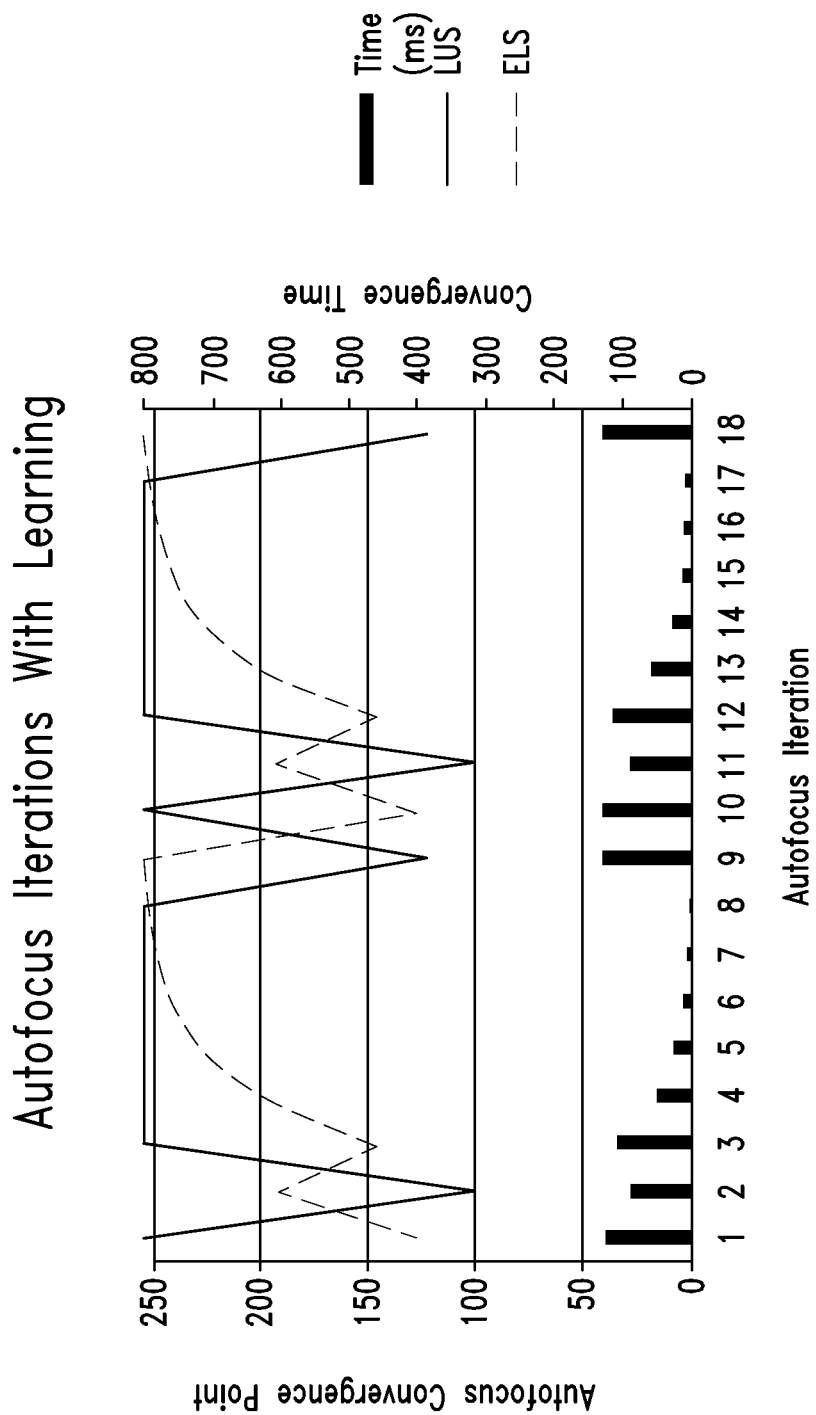
FIG. 4 shows the autofocus iterations with a method according to an embodiment.

FIG. 4 shows an example of the same algorithm, operating over the same range of points, with the same 18 final positions, but this time using the method according to an embodiment as described above. The initial preset is set to 127, as in FIG. 3, but this time a new starting position is calculated at each iteration using the formula above and a weighting factor of 0.5. The starting position is again shown by the broken line in FIG. 4. It can be seen that time taken to reach the extreme point of 255 gets less and less as the starting position gets closer. This example yields a worst case time taken of 131 ms, which is slightly worse than before, but the average time taken has reduced to 62.4 ms, significantly better than before.

The advantage of a smaller worst case time for less frequently used convergence points may be evaluated against the advantage of a smaller average time for more frequently used convergence. A weighting factor of 0 will cause the system to perform as if the learning algorithm is disabled. A weighting factor of 1 will cause the system to always use the last convergence point as a starting point. A value deemed acceptable may be chosen by analyzing real data on a real IQ algorithm.

It will be appreciated that alterations and modifications may be made to the above without departing from the scope of the disclosure. Naturally, in order to satisfy local and specific requirements, a person skilled in the art may apply to the solution described above many modifications and alterations. Particularly, although the present disclosure has been described with a certain degree of particularity with reference to specific embodiments thereof, it should be understood that various omissions, substitutions and changes in the form and details as well as other embodiments are possible; moreover, it is expressly intended that specific elements and/or method steps described in connection with any disclosed embodiment of the disclosure may be incorporated in any other embodiment as a general matter of design choice.

Similar considerations apply if the program (which may be used to implement each embodiment of the disclosure) is structured in a different way, or if additional modules or functions are provided; likewise, the memory structures may be of other types, or may be replaced with equivalent entities (not necessarily consisting of physical storage media). Moreover, the proposed solution lends itself to be implemented with an equivalent method (having similar or additional steps, even in a different order). In any case, the program may take any form suitable to be used by or in connection with any data processing system, such as external or resident software, firmware, or microcode (either in object code or in source code). Moreover, the program may be provided on any computer-usable medium; the medium can be any element suitable to contain, store, communicate, propagate, or transfer the program. Examples of such medium are fixed disks (where the program can be pre-loaded), removable disks, tapes, cards, wires, fibers, wireless connections, networks, broadcast waves, and the like; for example, the medium may be of the electronic, magnetic, optical, electromagnetic, infrared, or semiconductor type.

In any case, the solution according to the present disclosure lends itself to be carried out with a hardware structure (for example, integrated in a chip of semiconductor material), or with a combination of software and hardware.

Some embodiments may take the form of computer program products. For example, according to one embodiment there is provided a computer readable medium comprising a computer program adapted to perform one or more of the methods described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), discrete circuitry, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology. In some embodiments, some of the modules or controllers separately described herein may be combined, split into further modules and/or split and recombined in various manners.

The systems, modules and data structures may also be transmitted as generated data signals (e.g., as part of a carrier wave) on a variety of computer-readable transmission mediums, including wireless-based and wired/cable-based mediums.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    determining, using a data processing device, at least one starting setting of an image sensor, the starting setting including a value for at least one controllable parameter of the image sensor, the at least one controllable parameter including a value indicative of an average of historic data associated with previously captured digital images;
    receiving, responsive to a user request, a digital image with the image sensor;
    calculating, using the data processing device, an image metric according to the at least one controllable parameter;
    comparing, using the data processing device, the calculated image metric with a threshold range;
    recursively adjusting, using the data processing device, the value of the at least one controllable parameter until the calculated image metric is within the threshold range;
    storing, using the data processing device, the adjusted value in a repository of historic data; and
    modifying, using the data processing device, the starting setting based on the adjusted value of the at least one controllable parameter.

2. The method of claim 1 wherein the modifying includes determining a new value for a starting setting NLS according to the following formula:

NLS=ELS-(ELS-LUS)*WF where
    ELS=existing starting settings;
    LUS=last used settings; and
    WF=determined weighting factor.

3. The method of claim 1 wherein the recursively adjusting includes using an image quality algorithm.

4. The method of claim 3 wherein the image quality algorithm includes a hill climb search algorithm.

5. The method of claim 1 wherein the at least one controllable parameter comprises a plurality of controllable parameters, a plurality of image metrics associated with respective controllable parameters of the plurality of controllable parameters are calculated, and each of the plurality of calculated image metrics are compared to a respective threshold range.

6. A system, comprising:
    a memory configured to store historical data related to previously captured digital images; and
    one or more processing devices configured to:
        retrieve a stored image-sensor control parameter from the memory, the control parameter including a value indicative of an average of historic data associated with previously captured digital images;
        calculate an image metric of an image received according to the control parameter;
        compare the calculated image metric with an image-metric threshold range;
        recursively adjust the value of the control parameter, calculate the image metric and compare the calculated image metric with the image-metric threshold range until the calculated image metric is within the image-metric threshold range; and
        modify the value indicative of the average of historical data of the stored image-sensor control parameter based on the adjusted value of the control parameter.

7. The system of claim 6, further comprising a solid state image sensor coupled to the one or more processing devices.

8. The system of claim 7, further comprising an integrated circuit including at least one of:
    the one or more processing devices; and
    the solid state image sensor.

9. The system of claim 6 wherein the one or more processing devices is configured to modify the value indicative of the historical data NLS according to:

NLS=ELS-(ELS-LUS)*WF where
    ELS=existing starting settings;
    LUS=last used settings; and
    WF=determined weighting factor.

10. The system of claim 6 wherein the one or more processing devices is configured to employ an image quality algorithm in the recursively adjusting.

11. The system of claim 10 wherein the image quality algorithm includes at least one of:
    a hill climb search algorithm;
    a full sweep search; and
    an adaptive step size hill climb algorithm.

12. The system of claim 6 wherein the one or more processing devices are configured to:
    calculate a plurality of image metrics of the received image according to the control parameter;
    compare the plurality of calculated image metrics with respective threshold ranges; and
    recursively adjust the value of the control parameter, calculate the plurality of image metrics and compare the calculated image metrics with the respective threshold ranges until the calculated image metrics are within the respective threshold ranges.

13. The system of claim 6 wherein the system is configured as a digital image processing device.

14. The system of claim 6 wherein the one or more processing devices are configured to implement:
    a statistics accumulator configured to calculate the image metric; and
    an exposure controller configured to recursively adjust the value of the control parameter, calculate the image metric and compare the calculated image metric with the threshold range until the calculated image metric is within the threshold range.

15. The system of claim 6, further comprising a mobile phone transceiver.

16. A non-transitory computer-readable medium whose contents configure an image sensor controller to perform a method, the method comprising:
    determining at least one control parameter of the image sensor, the at least one control parameter including a value indicative of an average of historic data of previously captured digital images;
    calculating a plurality of image metrics of a digital image received according to the at least one control parameter;
    comparing each of the plurality of image metrics with a respective image-metric threshold range;

recursively adjusting the value of the at least one control parameter until each calculated image metric is within the respective image-metric threshold range; and modifying the value indicative of the average of historical data based on the adjusted value of the at least one control parameter.

17. The non-transitory computer-readable medium of claim 16 wherein the modifying includes determining a new value of a starting setting NLS according to the following formula:

$$NLS=ELS-(ELS-LUS)*WF$$

where
ELS=existing starting settings;
LUS=last used settings; and
WF=determined weighting factor.

18. The non-transitory computer-readable medium of claim 16 wherein the non-transitory computer-readable medium comprises an imaging software product.

19. An electronic device, comprising:
a statistics accumulator configured to calculate image metrics of received images; and
an exposure controller configured to:
retrieve a stored image-sensor control parameter including at least one value indicative of an average of historical data of previously captured digital images;
recursively,
compare one or more calculated image metrics of a received image with one or more corresponding image-metric threshold ranges; and
adjust the value of the control parameter until the one or more calculated image metrics are within the one or more corresponding image-metric threshold ranges; and
modify the value indicative of the average of historical data of the stored image-sensor control parameter based on the adjusted value of the control parameter.

20. The electronic device of claim 19 wherein the exposure controller is devices is configured to modify the value indicative of the historical data NLS according to:

$$NLS=ELS-(ELS-LUS)*WF$$

where
ELS=existing starting settings;
LUS=last used settings; and
WF=determined weighting factor.

21. The electronic device of claim 19 wherein the exposure controller is configured to employ at least one of:
a hill climb search algorithm;
a full sweep search; and
an adaptive step size hill climb algorithm.

22. A system comprising:
means for calculating image metrics of received digital images; and
means for:
retrieving a stored image-sensor control parameter including at least one value indicative of an average of historical data of previously captured digital images;
recursively,
comparing one or more calculated image metrics of a received image with one or more corresponding image-metric threshold ranges; and
adjusting the value of the control parameter until the one or more calculated image metrics are within the one or more corresponding image-metric threshold ranges; and
modifying the value indicative of the average of historical data of the stored image-sensor control parameter based on the adjusted value of the control parameter.

23. The system of claim 22, further comprising a memory configured to store the stored image-sensor control parameter.

24. The system of claim 22, further comprising an image sensor.

25. The method of claim 1 wherein the threshold range is a range of expected values.

26. The method of claim 1 wherein the comparing comprises determining whether the image metric satisfies a convergence criteria.

27. The electronic device of claim 19 wherein the image-metric threshold ranges comprise ranges of expected values.

28. The electronic device of claim 19 wherein the comparing comprises determining whether a convergence criteria is satisfied.

* * * * *